(12) United States Patent
Scranton, Jr. et al.

(10) Patent No.: US 7,563,424 B2
(45) Date of Patent: Jul. 21, 2009

(54) METHOD FOR REMOVING SULFUR COMPOUNDS FROM FLUIDS USING COMPRESSED METAL OXIDE COMPOSITION PARTICLES

(75) Inventors: Delbert C. Scranton, Jr., Chesterfield, MO (US); Thomas G. Braga, St. Louis, MO (US); Alan D. Johnson, Collinsville, IL (US); Alvin Samuels, New Orleans, LA (US)

(73) Assignee: M-I, LLC, Chesterfield, MO (US)

( * ) Notice: Subject to any disclaimer, the term of this patent is extended or adjusted under 35 U.S.C. 154(b) by 801 days.

(21) Appl. No.: 10/970,921

(22) Filed: Oct. 22, 2004

(65) Prior Publication Data

US 2005/0056567 A1 Mar. 17, 2005

Related U.S. Application Data

(60) Division of application No. 09/956,065, filed on Sep. 19, 2001, now Pat. No. 6,809,063, which is a continuation-in-part of application No. 09/663,966, filed on Sep. 19, 2000, now Pat. No. 6,664,210, which is a continuation-in-part of application No. 09/379,529, filed on Aug. 24, 1999, now Pat. No. 6,228,802.

(51) Int. Cl.
*B01D 53/48* (2006.01)

(52) U.S. Cl. ............ 423/244.06; 423/210; 423/244.01; 423/244.09; 423/244.1; 208/244; 208/247; 208/249; 210/749

(58) Field of Classification Search .................. 423/210, 423/244.06, 244.01, 244.09, 244.1; 208/244, 208/249, 247; 210/749
See application file for complete search history.

(56) References Cited

U.S. PATENT DOCUMENTS

| 4,105,590 | A | | 8/1978 | Koberstein et al. |
|---|---|---|---|---|
| 4,225,417 | A | | 9/1980 | Nelson |
| 4,287,050 | A | | 9/1981 | Eastman et al. |
| 4,664,903 | A | | 5/1987 | Becker et al. |
| 4,732,888 | A | | 3/1988 | Jha et al. |
| 5,167,919 | A | | 12/1992 | Wagner |
| 5,393,724 | A | | 2/1995 | Okajima et al. |
| 5,529,762 | A | * | 6/1996 | Alexander ............. 423/244.07 |
| 5,670,445 | A | | 9/1997 | Kitahara et al. |
| 5,776,331 | A | * | 7/1998 | Khare et al. ................. 208/247 |
| 5,801,115 | A | | 9/1998 | Albers et al. |
| 5,914,288 | A | | 6/1999 | Turk et al. |
| 5,972,835 | A | | 10/1999 | Gupta |
| 5,997,829 | A | | 12/1999 | Sekine et al. |
| 6,103,208 | A | * | 8/2000 | Ogawa et al. ............ 423/213.2 |
| 6,338,794 | B1 | | 1/2002 | Khare |
| 2002/0052291 | A1 | | 5/2002 | Siriwardane |

FOREIGN PATENT DOCUMENTS

| RU | 2079357 C1 | 5/1997 |
|---|---|---|
| RU | 2088329 C1 | 8/1997 |
| RU | 2164445 C1 | 3/2001 |
| SU | 1213976 A | 2/1986 |

OTHER PUBLICATIONS

PCT International Supplementary European Search Report, Int. App. No. PCT/US0129267, mailed Sep. 9, 2005, 3 pages.
PCT International Search Report or the Declaration, Int. App. No. PCT/US01/29267, mailed Dec. 14, 2001, 4 pages.
PCT International Preliminary Examination Report, Int. App. No. PCT/US01/29267, mailed Feb. 10, 2003, 4 pages.

* cited by examiner

*Primary Examiner*—Stuart Hendrickson
(74) *Attorney, Agent, or Firm*—Thompson Coburn LLP; Steven M. Ritchey, Esq.

(57) ABSTRACT

The present invention relates to a compressed metal oxide composition particle comprised of metal oxide and an organic binder, with the binder preferably being a water insoluble cellulose composition. The present invention also relates to a method for forming a compressed metal oxide composition particle, with the preferred method including compressing a metal oxide and binder mixture to form compressed metal oxide composition particles having a final particle size of between about 0.1 mm and about 200 mm.

14 Claims, 8 Drawing Sheets

|  | Initial | | | 6-Hours | | | 14-Hours | | | 22-Hours | | |
| --- | --- | --- | --- | --- | --- | --- | --- | --- | --- | --- | --- | --- |
|  | Inlet | Outlet | % Removal | Inlet | Outlet | % Removal | Inlet | Outlet | % Removal | Inlet | Outle | % Removal |
| COS | 5.2 | 4.0 | 23.1 | 5.4 | 4.3 | 20.7 | 4.9 | 3.8 | 22.9 | 5.1 | 4.0 | 22.6 |
| $H_2S$ | 4.7 | 0.0 | 100.0 | 4.8 | 0.0 | 100.0 | 4.4 | 0.0 | 100.0 | 4.0 | 0.0 | 100.0 |
| $CS_2$ | 1.9 | 0.5 | 72.9 | 1.8 | 0.6 | 64.4 | 1.5 | 0.3 | 79.2 | 1.4 | 0.2 | 84.5 |
| DMS | 1.6 | 0.9 | 44.4 | 1.8 | 1.0 | 43.2 | 1.7 | 0.9 | 47.7 | 1.6 | 1.1 | 35.0 |
| MeSH | 6.1 | 1.2 | 80.9 | 6.0 | 0.0 | 100.0 | 5.5 | 0.2 | 97.1 | 5.3 | 0.0 | 100.0 |
| EtSH | 1.8 | 0.5 | 74.6 | 1.7 | 0.0 | 100.0 | 1.5 | 0.0 | 100.0 | 1.3 | 0.0 | 100.0 |
| PrSH | 0.3 | 0.0 | 100.0 | 0.3 | 0.0 | 100.0 | 0.2 | 0.0 | 100.0 | 0.2 | 0.0 | 100.0 |
| TOTAL | 21.6 | 7.0 | 67.7 | 21.7 | 5.9 | 72.7 | 19.7 | 5.2 | 73.8 | 18.9 | 5.3 | 71.9 |
| COPPER STRIP | 2E | 1B | | 2E | 1B | | 2D | 1A | | 2E | 1A | |

Fig. 1

|  | Initial | | | 6-Hours | | | 14-Hours | | | 22-Hours | | |
| --- | --- | --- | --- | --- | --- | --- | --- | --- | --- | --- | --- | --- |
|  | Inlet | Outlet | % Removal | Inlet | Outlet | % Removal | Inlet | Outlet | % Removal | Inlet | Outlet | % Removal |
| COS | 4.8 | 4.1 | 13.8 | 5.0 | 4.6 | 7.67 | 4.8 | 3.9 | 19.2 | 4.6 | 4.1 | 10.2 |
| $H_2S$ | 6.4 | 0.0 | 100.0 | 6.9 | 0.0 | 100.0 | 6.2 | 0.0 | 100.0 | 5.9 | 0.0 | 100.0 |
| $CS_2$ | 2.4 | 1.0 | 60.2 | 2.2 | 0.4 | 80.1 | 2.0 | 0.7 | 63.1 | 1.9 | 0.6 | 68.8 |
| DMS | 1.9 | 0.5 | 71.3 | 1.6 | 0.4 | 76.2 | 1.4 | 0.7 | 51.4 | 1.7 | 0.9 | 47.4 |
| MeSH | 5.8 | 0.3 | 95.0 | 5.2 | 0.0 | 100.0 | 5.4 | 0.0 | 100.0 | 5.0 | 0.0 | 100.0 |
| EtSH | 2.2 | 0.7 | 69.0 | 1.9 | 0.0 | 100.0 | 1.8 | 0.0 | 100.0 | 1.8 | 0.0 | 100.0 |
| PrSH | 0.5 | 0.2 | 68.1 | 0.5 | 0.0 | 100.0 | 0.4 | 0.0 | 100.0 | 0.3 | 0.0 | 100.0 |
| TOTAL | 23.8 | 6.7 | 71.7 | 23.3 | 5.5 | 76.6 | 21.9 | 5.3 | 75.8 | 21.1 | 5.6 | 73.4 |
| COPPER STRIP | 3B | 1B |  | 3B | 1B |  | 3A | 1A |  | 3A | 1A |  |

Fig. 3

METHOD FOR REMOVING SULFUR COMPOUNDS FROM FLUIDS USING COMPRESSED METAL OXIDE COMPOSITION PARTICLES

CROSS REFERENCE TO RELATED APPLICATIONS

This application is a divisional of U.S. Ser. No. 09/956,065 filed Sep. 19, 2001, now U.S. Pat. No. 6,809,063, which is a continuation-in-part of U.S. Ser. No. 09/663,966 filed Sep. 19, 2000, now U.S. Pat. No. 6,664,210, which is a continuation-in-part of U.S. Ser. No. 09/379,529, filed Aug. 24, 1999, now U.S. Pat. No. 6,228,802, the disclosures of which are incorporated herein by reference.

FIELD OF INVENTION

The present invention relates to a compressed metal oxide composition for use in removing contaminants, including sulfur compounds, from fluids, and a methods for making such compressed metal oxide composition. More preferably, the present invention relates to a compressed iron oxide composition, with the binder preferably being a water insoluble composition.

BACKGROUND OF INVENTION

It is well known to use metal oxides, particularly iron oxide ($Fe_xO_y$) in a reactor bed to remove contaminants, typically sulfur compounds, especially hydrogen sulfide ($H_2S$), from fluids, typically gas streams. Sulfur compounds are removed from fluids because they are known contaminants, which potentially make gas streams or other fluids unsalable. Gas that contains too much sulfur is known as sour gas. As such, in the gas industry, as well as related industries, it is considered necessary to remove sulfur compounds from fluids, including gas. Note that these fluids are typically devoid of oxygen. (It is known that oxygen can increase reactivity between a metal oxide composition and contaminants.) For this reason, there is a need for products that remove sulfur compounds from fluids efficiently and cost effectively. It is further desired to have a method or composition that does not require the inclusion of activating agents, such as oxygen. Unfortunately, most commercially available iron oxide compositions (the most frequently used metal oxide material in removing sulfur) that operate at ambient conditions and are generally non-activated, hold an amount of sulfur equal to at most 20% by weight of the total iron oxide composition. More typically, iron oxide material (like that compressed in the present process) will hold, on average, 0.12 lbs. of $H_2S$/lb. of iron oxide. The percent held is dependent, in part, on the particular species of iron oxide used. Increased $H_2S$ absorption capacity for iron oxide compositions, above 20%, typically requires the addition of a caustic or oxygen to the feed gas, which is dangerous and potentially difficult, especially at high pressures. This is problematic because approximately 80% of the total metal oxide product is unused. For this reason, frequent replacement of the metal oxide is required. Consequently, it is desired to increase the percent by weight of sulfur held by the total metal oxide product.

Sulfur removal on a level that treats up to millions of cubic feet of gas per day or on an industrial scale, typically requires the use of large reactor beds filled with the iron oxide media or product. Typically, this media is comprised of iron oxide and a carrier such as montmorillonite or wood chips. In order to eliminate frequent change-outs, which is the replacement of spent metal oxide media (media that no longer has suitable reactivity with sulfur) with new metal oxide media, large or numerous reactor beds are used. These reactor beds will either be very tall, 10 feet or higher, or multiple reactors will be lined up in succession so that a plurality of reactor beds will be used. If the reactor beds are too small or few, the metal oxide will be spent too fast. This is because when treating large volumes of gas or other fluids, the metal oxide found in the metal oxide media will be rapidly reacted. In order to have a sufficient bed life so that frequent changings of the metal or iron oxide media is not required, large amounts of metal oxide must be used. This is disadvantageous for a couple of reasons. First, the amount of sulfur held by the metal or iron oxide composition is low relative to the total weight of the product used. In order to increase efficiency, it is desired to have a product that holds a greater percentage of reacted sulfur per pound of total product. Secondly, the amount of area required to remove sulfur can increase costs. It is desired to have the option to decrease the total area required to remove $H_2S$. In other words, it is desired to hold a greater amount of sulfur with a decreased amount of metal oxide composition.

One way to increase the amount of sulfur held in a reactor vessel is to pelletize or compress the metal oxide. The amount of sulfur held by the metal oxide composition is increased because there is more available metal oxide in the vessel. Normally, metal oxide is placed on a carrier, with the carrier comprising approximately 80% by weight of the metal oxide composition. Conversely, a pellet is typically comprised of an amount of binder equal to from about 1% to about 20% by weight of the pelletized mixture. As can be seen, the amount of metal oxide is significantly increased. The binders that have been used to form the pelletized iron oxide particles include cement, bentonite, and similar compositions, especially inorganic compositions. The pelletized particles made from these binders, however, have suffered from a problem in that it appears that the efficiencies have been lowered and that the reactivity of the metal oxides has been decreased. In particular, the amount of sulfur held is not significantly increased over the amount of sulfur held by the same species of metal oxide particle on a carrier. For this reason, prior attempts to pelletize metal oxide have been considered unsuccessful because of inadequate sulfur reactivity, in particular, holding capacity. Thus, it is necessary to find a binder that allows for sufficient binding of the metal or iron oxide particles without lowering the reactivity or efficiency with which the sulfur compounds are removed. More particularly, it is necessary to find a binder that permits the metal oxide to hold a greater amount of sulfur, in particular, $H_2S$, without the presence of a caustic or the addition of oxygen in some form.

As stated, it has been known to pelletize metal oxides for use in removing sulfur compounds from fluids. In particular, U.S. Pat. No. 4,732,888, invented by Jha et al. discloses a zinc ferrite pellet for use in hot coal gas desulfurization. The patent discloses a composition comprised of zinc and iron oxide compressed together with inorganic and organic binders, and a small amount of activator. Inorganic binders include bentonite, kaolin, and Portland Cement. The organic binders include starch, methylcellulose, and molasses. The pellets have a very specific product design because they are used in beds having temperatures of at least 650° C. Because of the high temperatures, the organic binders dissipate leaving pellets that are fragmented and porous. Thus, the organic binders are included for the specific purpose of holding the pellets together, initially, and then dissipating so as to create greater porosity. While this design is outstanding for use in high temperature coal desulfurization processes, it does not provide for sufficient removal at ambient conditions. As implied, it has been observed that inorganic binders decrease the amount of sulfur removed by pelletized metal oxides. As a result, insufficient removal of sulfur will likely occur at ambient or near ambient conditions when inorganic binders are used to bind the pellets together. It should also be noted, that it has previously been believed that organic binders were unacceptable for forming pellets used at ambient conditions, because the organic binders generally do not provide for a pellet that has sufficient crush strength, or there is insufficient reactivity, or the use of the binders creates a pellet that is cost prohibitive.

SUMMARY OF INVENTION

The present invention relates to a compressed metal oxide composition used in the removal of contaminants, preferably sulfur compounds, from fluids, and methods related thereto. The compressed metal oxide composition will be comprised of an amount of metal oxide equal to at least 80% by weight of the compressed metal oxide composition. The compressed metal oxide composition will retain an average amount of sulfur equal to at least 10% by weight of the compressed metal oxide composition and, more preferably, an amount of sulfur equal to at least 30% by weight of the compressed metal oxide composition. Importantly, the compressed metal oxide composition will hold a greater amount of sulfur than if the particular metal oxide species used to form the compressed metal oxide composition was used in association with a carrier. The compressed metal oxide composition is further advantageous because it will sufficiently remove sulfur at temperatures of less than 200° C. and, even more advantageously, at ambient conditions.

The compressed metal oxide composition will be comprised of an amount of metal oxide, preferably in powder form or having a small particle size, and a binder. The metal oxide will have a particle size ranging between about 0.1 microns and about 100 microns, which means that the metal oxide will be similar to dust, also known as fines. Any of a variety of metal oxides, which are reactive with sulfur compounds may be used to form the compressed metal oxide composition. Most preferably, the metal oxide will be of the formula $Me_xO_y$, with Me selected from the group consisting of row 4, 5, 6, and 7 metals, with x equal to between 1 and 3,1 and y equal to between 1 and 4. It is more preferred if the metal oxide is an iron, zinc, or manganese oxide composition, as these metal oxides have been known to readily react with sulfur compounds. In particular, iron oxide of the formula $Fe_aO_b$ will be preferred with a equal to between 1 and 3, and b equal to between 1 and 4. As such, compositions that include iron oxides of the formula $Fe_3O_4$ are most preferred.

Any of a variety of organic binders may be used to hold the metal oxide particles together to thereby form the compressed metal oxide composition. The binder selected must permit the metal oxide to be reactive with the sulfur compounds. As such, it has been determined that suitable binders include starch compositions, carboxymethylcellulose, and mixtures thereof. Other suitable binders include cellulose compositions. Water insoluble binders are preferred, with water insoluble cellulose compositions being the most preferred binders. Additionally, lignin, bentonite, and lignosulfonate may also be used as binders. The binder can be added to the metal oxide in an amount equal to between 0.5% and 20% by weight of the metal oxide and, more preferably, in an amount equal to between 0.5% and 5% by weight of the metal oxide.

The method of the present invention involves combining the binder with the metal oxide particles and thoroughly mixing the two constituents. Once the two constituents are mixed, it is necessary to compress the mixture so as to form the compressed metal oxide composition. The techniques used to compress the constituents to form the compressed metal oxide composition can be any of a variety of techniques or devices, including extrusion or compaction. Any compression device or method can be used, as long as the compressed metal oxide composition is suitably formed. The current invention uses extrusion or compaction to compress the metal oxide mixture. The constituents can be passed through an extruder to form a compressed metal oxide composition. Conversely, the constituents can be placed in a compactor to form a compressed metal oxide composition. A compactor is a device having at least two symmetrical wheels, which turn in opposite directions, thereby compacting the metal oxide composition between them. The use of either an extruder or a compactor has been found to produce compositions which have sufficient reactivity with contaminants, especially sulfur compounds. Any of a variety of compactor or extrusion devices may be used. The compressed metal oxide composition particles may be formed into the desired particle size at the time of formation or may be formed and then broken into the desired size. At least 90% of the compressed metal oxide composition particles shall have a final particle size equal to between about 0.1 mm to about 200 mm. It is not possible to have 100% of the compressed metal oxide composition particles within this range because the smaller end of the range will include compressed metal oxide composition particles which are powder or fines and some of these fines will enter into the final product. Preferably, the final particle size is equal to between about 0.1 mm and 20 mm. More preferably, the final particle size is equal to between about 0.5 mm to about 5 mm.

Preferably, once the metal oxide mixture has been compressed, it is broken apart so as to form the compressed metal oxide composition particles of the desired size. The smaller final particle size increases the amount of hydrogen sulfide which the compressed metal oxide composition particles are able to absorb. The broken apart compressed metal oxide composition particles are then processed through a screener for granular classification to ensure at least 90% of the particles have the correct particle size. Any oversize particles are discharged into a hammer mill, and then sent back to the screener. The fines, meanwhile, are recycled back into a batch of the compressed metal oxide composition.

The present invention is advantageous for a number of reasons. In particular, the compressed metal oxide composition particles allow for a product that can be used in a reactor bed, whereby the product reacts with a greater amount of sulfur so that a greater amount of sulfur is found in the reactor bed. This is desirable because a lesser amount of overall space can be used and fewer reactor vessel change-outs are required. The present invention is also advantageous because it demonstrates that compressed metal oxide composition particles can be formed that have sufficient reactivity with sulfur. This means that the particles are suitable for commercial use, unlike many other known pelletized metal oxide compositions. Finally, the present invention is advantageous over previous inventions which form pellets because the particles of the present invention are formed by breaking apart the composition to form smaller particle sizes which allow for more of the metal oxide to be available to react with the $H_2S$, thereby leading to increased absorption of the $H_2S$ when using these particles.

BRIEF DESCRIPTION OF THE DRAWINGS

FIG. 1 describes removal of various sulfur compounds from a propane liquid stream using pelletized iron oxide with measurements taken, initially, at 6 hours, 14 hours, and 22 hours;

FIG. 3 describes the same thing as FIG. 1, except a zinc oxide composition was used to remove the sulfur compounds;

DETAILED DESCRIPTION

Figure 2:
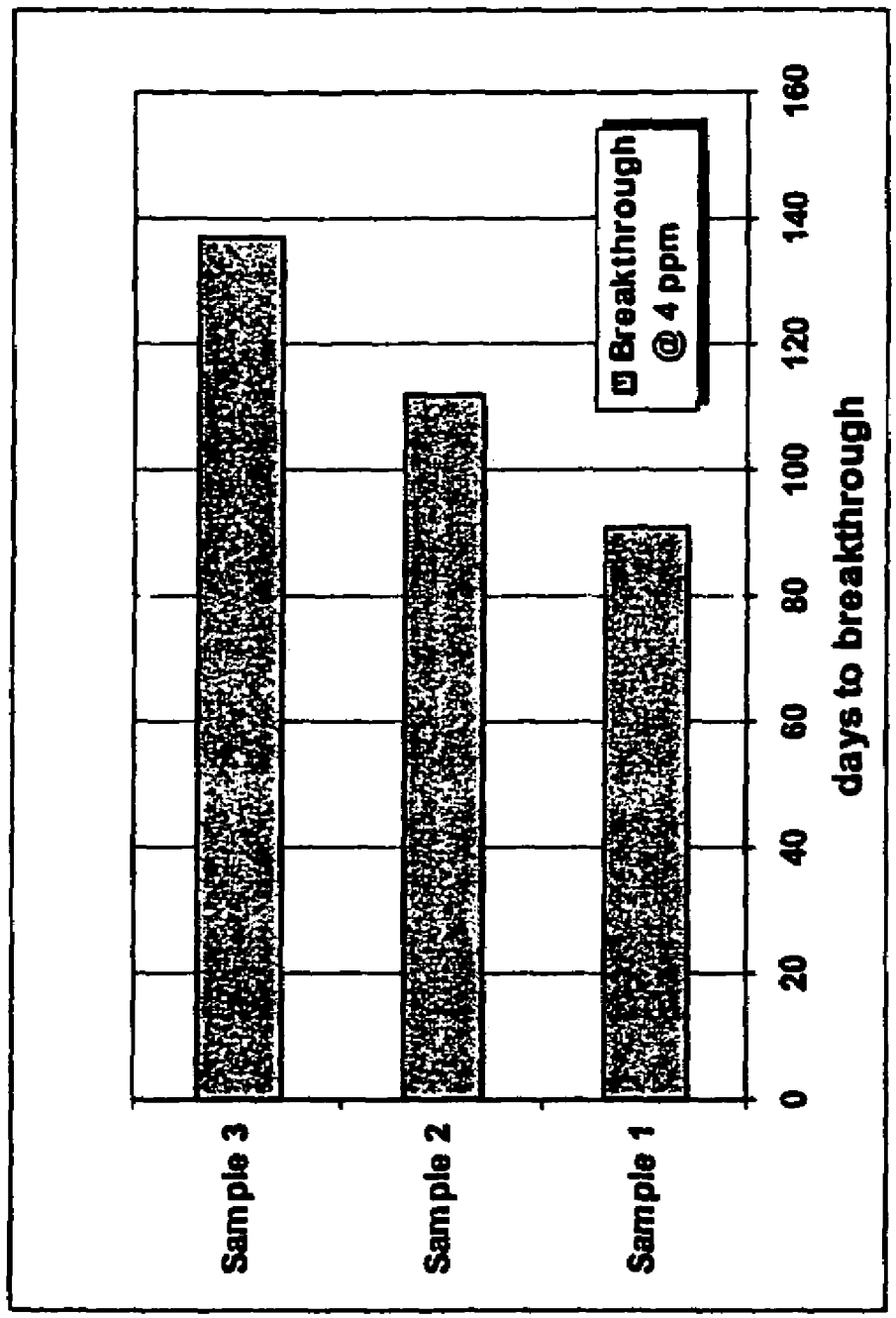
FIG. 2 shows the results of a standard laboratory performance test displaying the effects of particle size of the compressed metal oxide composition on removal of $H_2S$, by the composition.

The present invention relates to compressed metal oxide composition particles, a method of making such particles, and a method of using such particles to remove contaminants, preferably sulfur compounds, from fluids. The compressed metal oxide composition particles are preferably compressed iron oxide particles that are well suited for removing sulfur compounds, such as $H_2S$, from fluids. The compressed metal oxide composition advantageously retains a greater amount of the sulfur compounds than other metal oxide compositions. The compressed metal oxide composition can retain an average amount of sulfur equal to at least 10% and, preferably, 30% by weight of the compressed metal oxide composition. A compactor or extruder is used to form the compressed metal oxide composition, which is comprised of at least one metal oxide and a binder. The binder can be a starch composition, carboxymethylcellulose, and combinations thereof. Suitable binders also include cellulose compositions. Water insoluble cellulose compositions are the preferred binder. The compressed metal oxide composition can then be sized to a final particle size equal to between about 0.1 mm and about 200 mm. The final particle size is preferably equal to between about 0.1 mm and about 20 mm. More preferably, the final particle size is equal to between about 0.5 mm and about 5 mm.

The method is initiated by mixing an amount of metal oxide with an amount of binder to form a homogenous metal oxide mixture. Any method of mixing the two constituents can be used, as long as the constituents are thoroughly mixed and a homogenous binder/metal oxide mixture is formed. It is preferred to add the binder to the metal oxide in an amount equal to from about 0.5% to about 20% by weight of the metal oxide. More preferably, the binder is added to the metal oxide in an amount equal to between 0.5% and 5% by weight of the metal oxide.

Any of a variety of metal oxides can be used in the present invention, with the metal oxides defined by the formula $Me_xO_y$, whereby Me is selected from the group consisting of row 4, 5, 6, and 7 metals, with x equal to between 1 and 3 and y equal to between 1 and 4. More preferably, the metal oxide is selected from the group consisting of $Fe_aO_b$, ZnO, MnO, and combinations thereof, with a being equal to between 1 and 3, and b equal to between 1 and 4. Also, hydroxides of the metal oxide may be used. Iron oxide compositions ($Fe_aO_b$) are the most preferred metal oxides for use in the present invention. Preferably, the compressed metal oxide composition will include $Fe_3O_4$. This composition is commonly sold under the name "black iron oxide" and, as such, black iron oxides are preferred for use in the present invention.

The metal oxide will have a particle size ranging between about 0.1 microns and about 100 microns and, more preferably, between about 1.5 microns and 50 microns. As such, the unprocessed or raw metal oxide used to form the compressed metal oxide composition will be fines, or in powder form. Thus, a uniform body or compressed particle will be formed from a granular or fine material. Also, the particles are preferably porous so that they are believed to have at least 25 times more surface than other non-porous particles, such as solid particles of the same size. These are believed to be desired characteristics.

The binder that is mixed with the metal oxide should be such that it does not impact the reactivity of the metal oxide composition with sulfur. It is hypothesized that the binder should be such that it allows for the compressed metal oxide composition particles to have some porosity or transfer capability, which allows reasonable use of the interior of a particle. Regardless, the binder must allow the compressed metal oxide composition particle to retain an amount of sulfur equal to at least 10% by weight of the particle and, preferably, at least 30% by weight of the particle. The binder can be added to a metal oxide in an amount equal to between 0.5% and 20% by weight of the metal oxide, and, more preferably, in an amount equal to between 0.5% and 5% by weight of the metal oxide. The binder should be such that it is relatively water insoluble. It is necessary to prevent substantial dissolution of the binder by water because the particles are typically used in a moist environment. If water does dissolve the binder, the particles can potentially degrade, as the binder will no longer work. Thus, a water insoluble binder that does not degrade due to the presence of water is preferred. Any of a variety of binders fitting this description can be used; however, it is most preferred to use an organic binder such as water insoluble cellulose. It is preferred if the cellulose present in the compressed metal oxide particle composition is equal to, or less than, 15%.

The preferred binder is a water insoluble cellulose, or a mineral modified cellulose. A binder comprised of nearly 100% water insoluble cellulose is most preferred. Preferably, the binder absorbs less than 60% by weight water. An example of a suitable commercially available binder is TECHNOCEL™ 202, manufactured by the Cellulose Filler Factory Corp., Chestertown, Md.

In addition to the metal oxide used to form the compressed metal oxide composition, an amount of activator of metal oxide can be added to the mixture. The addition of the activator is intended to increase the reactivity of the compressed metal oxide composition particle and, in particular, will cause the particle to more readily react with sulfur compounds. Among the available activators are copper oxide, silver oxide, gold oxide, platinum oxide, cadmium oxide, nickel oxide, palladium oxide, lead oxide, mercury oxide, tin oxide, cobalt oxide, aluminum oxide, manganese oxide, and combinations thereof. It is most preferred, however, to use a copper oxide, as this has been known to most readily increase the reactivity of a metal oxide without the ready formation of hazardous compounds, as specified by the Environmental Protection Agency. It should be noted that when the metal oxide used is manganese oxide, the activator will be any available activator other than manganese oxide. The activator should be added in an amount equal to from about 0.5% to about 5% by weight of the metal oxide composition used to form the compressed metal oxide composition particles.

Once the metal oxide mixture has been mixed, the metal oxide mixture is compressed to form the compressed metal oxide composition. Compression can be achieved in a variety of ways, as long as compressed particles are formed. It is preferred to pass the composition through a compactor or an extruder so as to form a compressed metal oxide composition. Any of a variety of devices and methods can be used for forming the compressed metal oxide composition, as long as sufficient reactivity with sulfur is maintained. Compressed metal oxide composition particles having the desired final particle size can be produced directly by the extruder or compactor. The desired final particle size is equal to between about 0.1 mm and about 200 mm. Preferably, final particle size is between about 0.1 mm and 20 mm. More preferably final particles size is equal to between about 0.5 mm and about 5 mm. At least 90% of the compressed metal oxide composition particles will be in these ranges. It is not possible to have 100% of the particles be in the appropriate range because the smaller end of the range will include some particles sized to the level of powder or fines, some of which will end up in the final product. If compressed metal oxide composition particles having the desired final particle size are produced by the device, it is not necessary to break them apart or screen them.

Preferably, however, the compressed metal oxide composition is in larger pieces once it passes through the compactor or extruder. It is then broken apart into compressed metal oxide composition particles of the desired final particle size. Standard methods in the industry for forming particles out of compressed material can be used. The smaller particle size of the final product allows the metal oxide, which is present in the particles, to react with an increased amount of the $H_2S$, thus, increasing the amount of $H_2S$ removed.

Besides compacting or extruding the metal oxide and the binder, other compressed forms may be used. Among the available compressed forms are pellets, tablets, pestilles, ribbed, ribbed rings, rings, spheres, and extrusions.

Any method for compressing the metal oxide and binder together so that a carrier is not required, and it can be used in a reaction bed, can be used. It is further desired to form particles instead of simply adding metal oxide powder to a reaction vessel because for sufficient reactivity to occur, there must be space within the reactor to allow the fluid to pass. Powder would not allow for a sufficient flow rate.

When the compressed metal oxide composition is formed by extrusion, it may be necessary to dry the particles so as to reduce moisture. Any process for drying can be used, as long as the particles have a total water content of less than 10% by weight and, more preferably, less than 3% by weight. The temperature used to dry the particles should be any temperature that will not break down or incinerate the binder and which does not oxidize the metal oxide. Preferably, the temperature will be 150° C. or less and, more preferably, the temperature will be 90° C. or less. It is necessary to dry the particles to maximize the crush strength.

Dryers that may be used include a rotary dryer or belt dryer. The rotary dryer is preferred.

After drying, it is preferred to marumerize the compressed metal oxide composition particles formed by extrusion, as this has been found to increase the hardness and abrasion as measured by the percentage of fines in the treated extruded metal oxide composition. Any of a variety of marumerizers may be used in the present invention. Rotary drying may eliminate the need for a marumerizer.

After the compressed metal oxide composition particles are formed by breaking apart the compressed metal oxide composition, the particles are processed through a screener for granular classification. Oversize particles are discharged into a hammer mill, and then returned to the screener. The fines are recycled into a batch of the compressed metal oxide composition.

Once the compressed metal oxide composition particles have been formed, they should be placed in a reactor vessel so as to be contacted with fluids contaminated with sulfur compounds. The fluids will include gas, liquid, and combinations thereof. It is most preferred to remove sulfur compounds from contaminated gas streams, such as propane and hydrocarbon gases. Among the sulfur compounds that can be removed using the present compressed metal oxide composition particles are hydrogen sulfide ($H_2S$), carbonyl sulfide (COS), carbon disulfide ($CS_2$), Dimethyl Sulfide (DMS), and mercaptans, such as Methyl Mercaptan (MeSH), Ethyl Mercaptan (EtSH), and Propyl Mercaptan (PrSH). It should be noted that it is likely that other contaminants found in fluids, especially hydrocarbon gas, can be removed by the compressed metal oxide composition particles. These sulfur compounds can be removed under ambient conditions, more particularly, when the temperature is equal to or less than 70° C., with 200° C. being the highest temperature. Any pressure can be used. Additionally, the fluid stream can be passed over the compressed metal oxide composition particles at a velocity equal to at least 0.6 feet per minute in gases and 0.1 feet per minute for liquids.

The compressed metal oxide composition particles can retain an average amount of sulfur equal to at least 10% and, preferably, 30% by weight of the compressed metal oxide composition particles, and have an $H_2S$ holding capacity equal to at least 0.27 lbs. of $H_2S$ per pound of compressed metal oxide composition particles. From this, it can be concluded that the compressed metal oxide composition particles have increased sulfur holding capacity.

The following examples are for illustrative purposes only and are not meant to limit the claims in any way.

EXAMPLES

Example 1

A test was conducted to determine the effectiveness of extruded pelletized iron oxide in removing sulfur species contaminants, including hydrogen sulfide, carbonyl sulfide, mercaptans and, possibly, carbon disulfide. The test was initiated by packing a 2 inch by 12 inch column with approximately 1.25 pounds, or approximately 10 inches of pelletized iron oxide media. The iron oxide pellets were comprised of black iron oxide and a starch binder. An inlet valve was located at the bottom of the column so that contaminated liquid entered the column at the bottom and exited the top of the column. The gas to be purified was liquid propane contaminated with various sulfur species contaminants, including hydrogen sulfide, carbonyl sulfide, and light mercaptans. Measurements to determine the amount of sulfur contaminants were made when the gas entered the column, and when the gas exited the column with measurements taken at different times. FIG. 1 shows the initial amounts of various sulfur compounds entering the column. The contaminants were measured in parts per million (ppm) by weight. The specific conditions in the reactor or column are listed below as follows:

| Type of Treater | Single, Verticle | Flow Direction | Up Flow |
|---|---|---|---|
| Treater Temp | 65° F. | Contact Time | 15 mLs/min |
| L/D Ratio | 5:1 | CEP-1 | FM1 Extrusion |
| Sample Pressure | 360 psig | | |

L/D stands for Dieway Length/Diameter in the die of the extruder.

The sulfur contaminants were detected by using a copper strip test, which identified the amount of sulfur and contaminants in the liquid stream, by its corrosivity to polish copper strips by ASTM method D-1838.

As can be seen from FIG. 1, the pelletized iron oxide resulted in excellent removal of various sulfur compounds. In particular, $H_2S$ was readily removed by the pelletized iron oxide. Additionally, COS, $CS_2$, and mercaptans were readily removed. Thus, it was concluded that the pelletized iron oxide provided for excellent removal of sulfur compounds. This was considered important because it was known that previous iron oxide pellets did not sufficiently remove sulfur, as compared to iron oxide on a carrier.

Example 2

Compressed iron oxide composition particles of varying particle size were formed in order to test the effect of particle size on the performance of the compressed iron oxide composition. The compressed iron oxide composition particles were formed using a MS-75 compaction system by Hosokawa Bepex. The cellulose binder, TECHNOCEL™ 202, was first hydrated in a Ribbon Blender Model No. IM16 by placing 100 pounds of TECHNOCEL™ 202 in the blender, turning the blender on, and adding 80 pounds of water for six minutes and forty seconds at 40 psi. The blender was turned on for an additional five minutes to uniformly hydrate the TECHNOCEL™ 202. Next, 100 lbs. of cuprous oxide (Purple Copp 97N), was added, and the blender turned on for an additional five minutes. This blend was transferred up to the feed introduction level of the MS-75 Compactor and placed in an Accurate Feeder. Two thousand pounds of iron oxide having a moisture of 1.95% and a loose bulk density of 86 lbs/ft³ was released by gravity into an Acrison Feeder. The feeder then transferred the iron oxide into the Turbulizer Model No. TS8. The TECHNOCEL™ 202 blend was metered to the Turbulizer from the Accurate Feeder. The Turbulizer deposited the TECHNOCEL™ 202 iron oxide blend into the MS-75 compactor. The blender feed was metered to the rolls of the compactor via a vertical feed screw. After compaction, the flakes were discharged into the flake breaker, and then were mechanically conveyed to the screener for granular classification. The oversize material was discharged into the RD-8 hammer mill, then conveyed back to the screener. The fines were 5 recycled directly back into the feed hopper, and the on-size product granules were collected.

The composition specified to produce the granules was 87.7% iron oxide, 4.4% TECHNOCEL™ 202, 4.4% cuprous oxide, and 3.5% water.

A sample of a compressed iron formulation was screened to three different particle size distributions, as shown in Table 1.

TABLE 1

| | Distribution % by Weight | | |
|---|---|---|---|
| | Sample 1 | Sample 2 | Sample 3 |
| +3/8"-4 mesh | 47.8 | 0 | 0 |
| +4-6 mesh | 15.9 | 30.5 | 28.6 |
| +6-16 mesh | 36.3 | 69.5 | 65.3 |
| +16-30 mesh | 0 | 0 | 6.0 |

Basically, the average particle size decreases going from Sample 1 to Sample 3, as shown in Table 2.

TABLE 2

| Sample # | Particle size range, mm | Average particle size, mm |
|---|---|---|
| 1 | 1.0 to 9.5 | 4.5 |
| 2 | 1.0 to 4.75 | 2.5 |
| 3 | 0.5 to 4.75 | 2.0 |

Using a standard laboratory performance test, the effect of particle size on performance is shown in FIG. 2. Sample 1, which contained the largest particle sizes with an average particle size of 4.5 mm, took approximately 90 days to reach the breakthrough point of 4 ppm of hydrogen sulfide detected, Sample 2 containing particles of an average size of 2.5 mm took until approximately Day 115 to breakthrough at 4 ppm of hydrogen sulfide detected, while Sample 3 containing an average particle size of only 2.0 mm did not show a breakthrough of hydrogen sulfide at 4 ppm until approximately 135 days of testing. These results indicate that the decrease in average particle size increased the effective $H_2S$ removal capacity of the compressed metal oxide particles.

Example 3

The same procedure as Example 1 was followed except pelletized zinc oxide was tested instead of pelletized iron oxide. The conditions were as follows:

| Type of Treater | Single, Verticle | Flow Direction | Up Flow |
|---|---|---|---|
| Treater Temp | 65° F. | Contact | 11 mLs/min |
| L/D Ratio | 5:1 | CEP-1 | 2.0 extrusion |
| Sample Pressure | 360 psig | | |

The results of the test are disclosed in FIG. 3. It was observed that the pelletized zinc oxide, in general, removed most sulfur compounds except COS. Use of the pelletized zinc oxide resulted in suitable elimination of most sulfur compounds. This was considered important because normally zinc oxide suitably eliminates sulfur contaminants at higher temperatures. At ambient conditions, zinc oxide will typically hold between 3% and 8% total sulfur.

Example 4

Tests were conducted to determine the relative crush strength of pelletized iron oxide particles. Three types of iron oxide known as FM1 (Ferrimagnetic 1), FM2 (Ferrimagnetic 2), and Hoover were pelletized, with all three types of iron oxide being similar black iron oxides. The FM1 and FM2 iron oxides are ferrimagnetic porous iron oxide particles believed to range in size from 1.5 microns to 50 microns, with a hypothesized surface area of 10 m²/gm. The Hoover oxide is believed to be a much smaller grade material with little or no porosity. The iron oxide was blended with various types of binders, with the binders mixed in different amounts in solution. Also, various extruder die lengths were used. These variations were made to determine what combination would result in iron oxide particles having sufficient crush strength. A pelleting press manufactured by Kahl was used to form all the iron oxide pellets, with the pellets formed from the press having a diameter of 6 mm. To assess the strength of each pellet, a Kahl Pellet Hardness Tester was used. In order to derive accurate data, tests were made on ten pellets manufactured according to each method, with the results then averaged. The Kahl pellet tester is manufactured by Amandus Kahl Gmblt & Co., Hamburg, Germany. The following table shows the results of the tests, the particular type of binder for use in forming each of the pellets, the die length used to form the pellets, and the average crush strength.

oxide material was placed in a 4-foot glass reactor bed tube. This step was repeated for each test composition listed in Table 4. A sour gas stream containing 3,000 ppm by weight of $H_2S$ was passed over the various pelletized iron oxide compositions. Specifically, the gas was passed over the FM2 bed once, the FM1 bed three times, and the Hoover bed three times, all of which are listed in the chart below. The flow rate of the contaminated gas (Q) was set at one of three different rates: 2.09 liters per minute (L/min), 3.75 L/min, or 5.09 L/min. The outlet $H_2S$ was recorded as a function of time of the varying flow rates.

Figure 7:
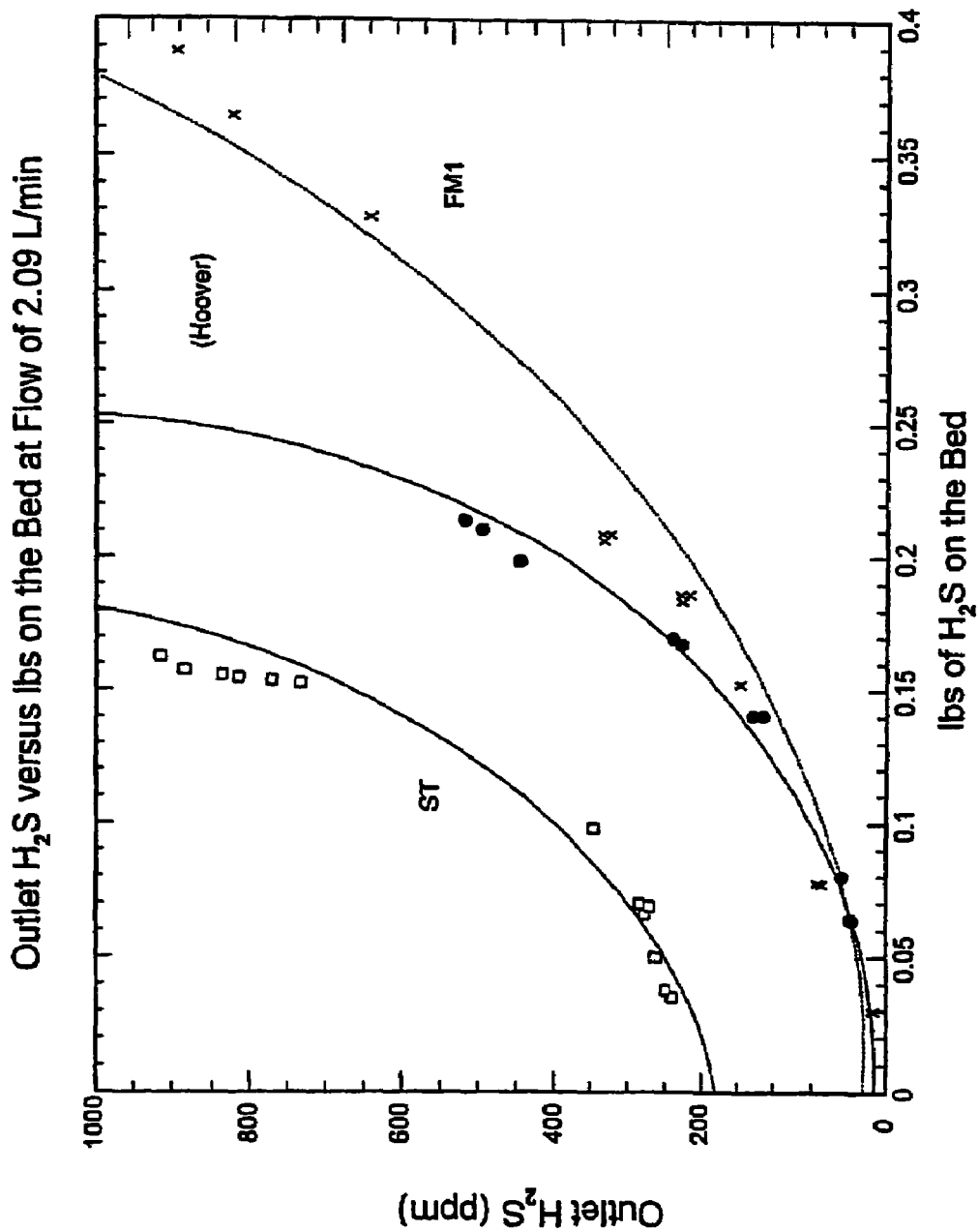
FIG. 7 discloses a comparison between non-pelletized iron oxide and two types of pelletized iron oxide, whereby outlet $H_2S$ is related to the pounds of $H_2S$ on the oxide bed; and, FIG. 8 relates to the same thing as in FIG. 7, except it compares three different types of pelletized iron oxide.

FIG. 7 shows how much $H_2S$ was held on the Hoover and FM1 types of iron oxide at a flow rate of 2.09 L/min before breakthrough of $H_2S$ occurred. Additionally, FIG. 7 shows how much sulfur was held on the same type of iron oxide used to form the FM1 composition, but with the iron oxide located

TABLE 3

LCI TEST SUMMARY

| Oxide | Water % | Binder | Dieway Length | Strength kg | Density |
|---|---|---|---|---|---|
| FM1 | 18.2 | None | 18 | Weak | 1.690 |
| FM1 | 15 | None | 18 | Weak | 1.448 |
| FM1 | 15 | 0.0075% CMC | 18 | Weak | 1.406 |
| FM1 | 15 | None | 36 | Weak | 1.477 |
| FM1 | 12 | 0.0075% CMC | 36 | Weak | 1.542 |
| FM1 | 13 | 0.0075% CMC | 36 | Weak | 1.508 |
| FM1 | 13 | 0.0075% CMC | 48 | Weak | 1.475 |
| FM1 | 13 | 0.0075% CMC | 60 | Weak | 1.454 |
| FM1 | 13 | 0.64% Starch | 30 | Fragile | 1.359 |
| FM1 | 16 | 0.78% Starch | 30 | Firm | — |
| FM1 | 17 | 0.84% Starch | 30 | 3.8 | — |
| FM1 | 15 | 12.5% Bentonite | 30 | 4.3 | 1.542 |
| Hoover | 17 | 1.0% Starch | 30 | 5.1 | — |
| FM2 | 17 | 1.0% Starch | 30 | 1.6 | — |
| FM1 | 19.2 | 1.34% Starch | 60 | — | — |
| FM1 | 17.3 | 1.33% Starch | 60 | 5.1 | — |
| FM1 | 17.2 | 1.33% Starch | 60 | 5.98 | — |

| Oxide | Water % | Binder* | Dieway Length | Strength kg | Density | Fines |
|---|---|---|---|---|---|---|
| FM2 | 15.3 | 1.04% Starch | 60 | 3.1 | 1.33 | 15.1 |
| FM2 | 15.3 | 1.04% Starch | 60 | 1.9 | 1.45 | 7.6 |
| FM2 | 18.8 | 2.36% Starch | 60 | 6.65 | 1.17 | 5.3 |
| FM2 | 18.8 | 2.36% Starch | 60 | 4.7 | 1.46 | 2.4 |
| FM2 | 18.9 | 2.34% Starch | 48 | 7.65 | 1.03 | 3.2 |
| FM2 | 18.9 | 2.34% Starch | 48 | 8.3 | 1.32 | 1.3 |
| FM2 | 18.9 | 2.34% Starch | 48 | 6.8 | 1.23 | 1.8 |
| FM2 | 18.9 | 2.34% Starch | 36 | 6.0 | 1.06 | 2.1 |
| FM2 | 18.9 | 2.34% Starch | 36 | 6.05 | 1.23 | 1.7 |

*Binder % on basis of dry weight oxide

The binder listing is the percentage of starch on a dry weight basis found in the pellets. The percent water represents the amount of binder and water solution mixed with the metal oxide material. The density of the pellets appears to be unrelated to the crush strength of the pellets.

As can be seen from the data, the use of starch and bentonite provided for excellent crush strength in the pellets formed there from. Carboxymethylcellulose resulted in a pellet having insufficient crush strength. Additionally, it was determined that a die length of at least 30 mm was preferred.

Example 5

Figure 8:
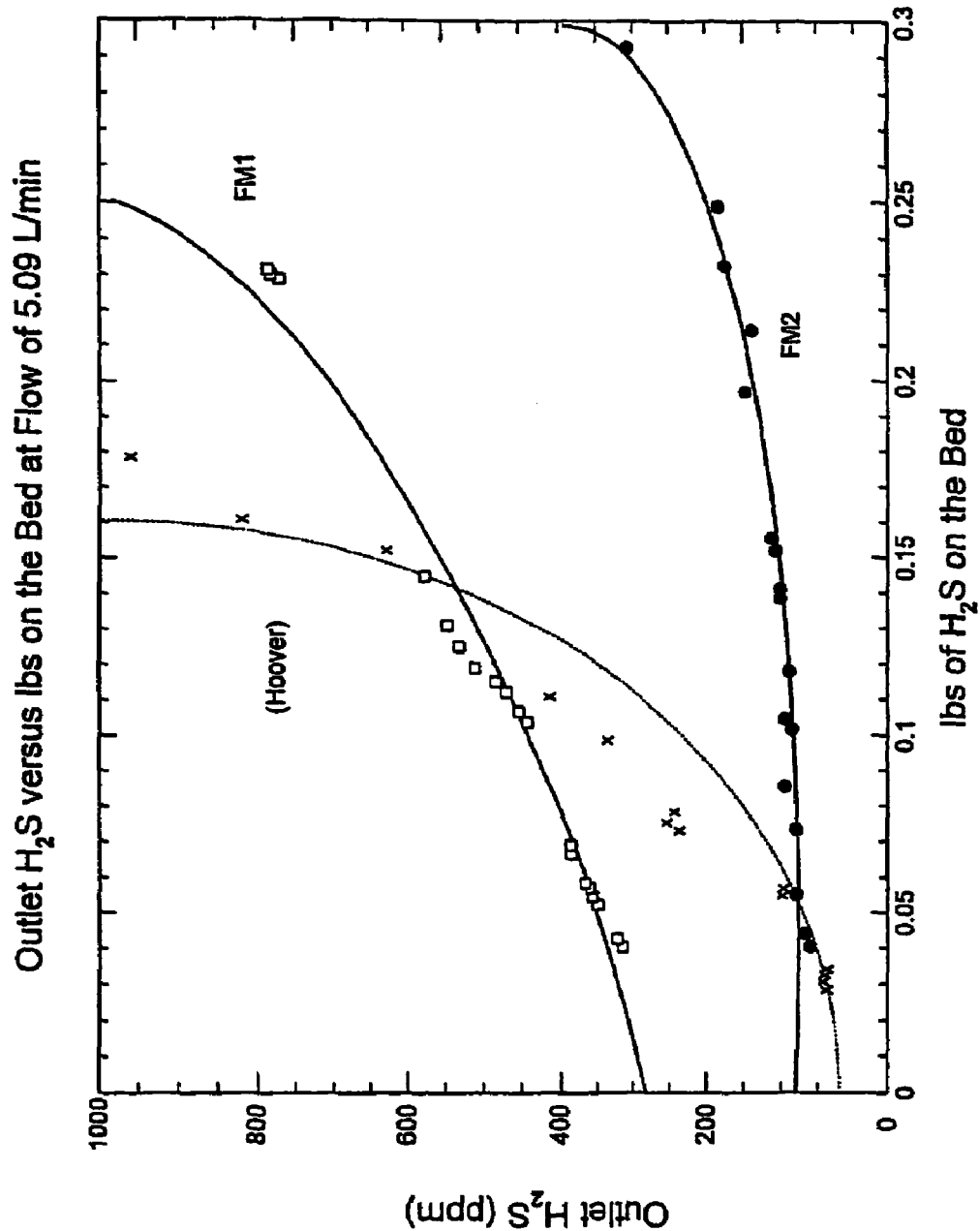

The present Example relates to testing the pelletized FM1, FM2, and Hoover iron oxides to evaluate the reactivity and efficiency of each composition in removing hydrogen sulfide from gas. Three reactor beds were filled with the three different types of iron oxide. Two pounds of the pelletized iron on a carrier. As can be seen, the pelletized iron oxide held significantly more sulfur. In FIG. 8, the same thing as FIG. 7 was shown, except a different flow rate, 5.09 L/min, was used. The system was pressurized at 6 psig, and the sour gas had a temperature of 68° F. The $H_2S$ was measured using an industrial scientific TMX 412 electronic gas analyzer, calibrated with a standard 124 ppm $H_2S$ in tube mixture. Also, a Kitagawa tube was used as a cross-check to confirm the $H_2S$ levels.

Figure 4:
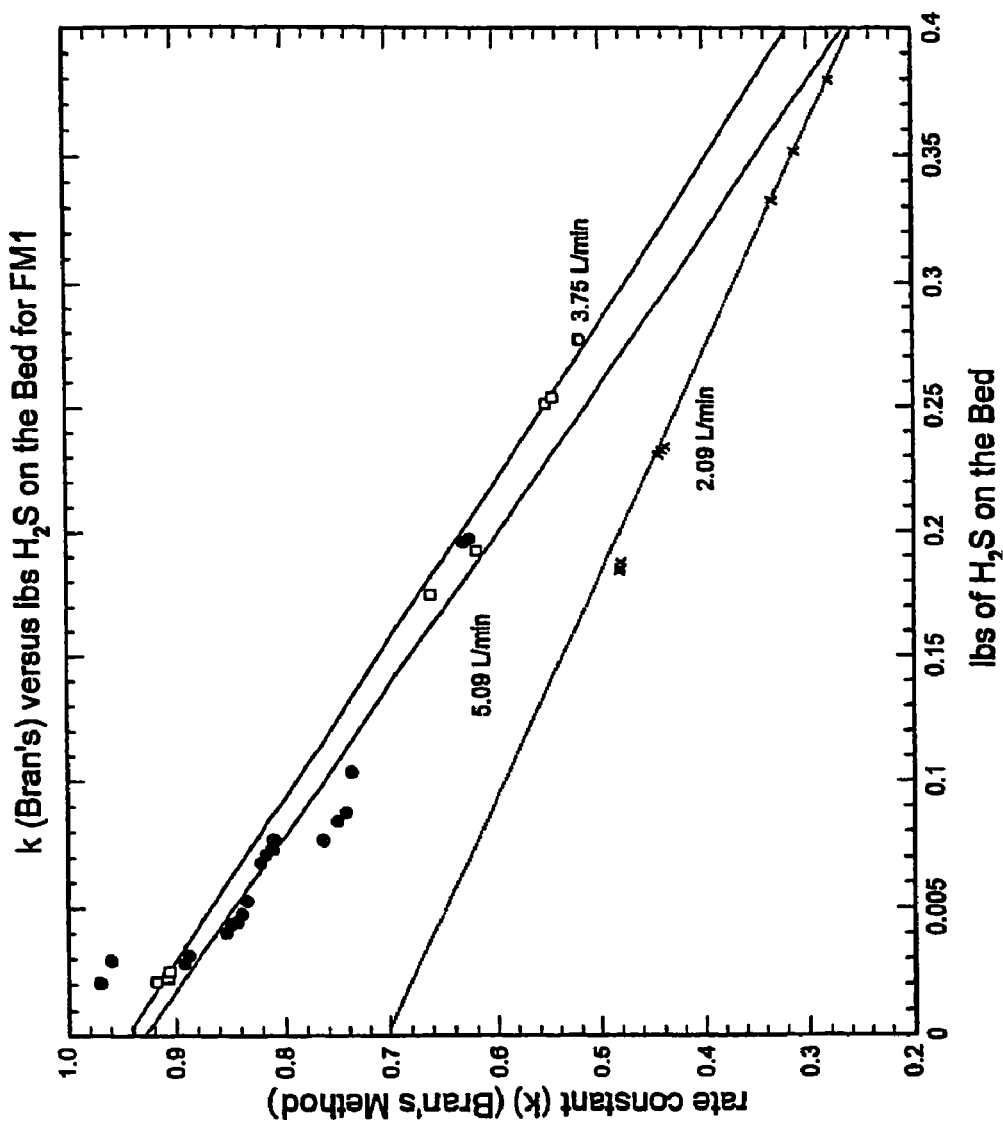
FIG. 4 is a graph, which relates three flow rates to a k (Bran's) constant versus lbs. of $H_2S$ on an oxide bed.
Figure 5:
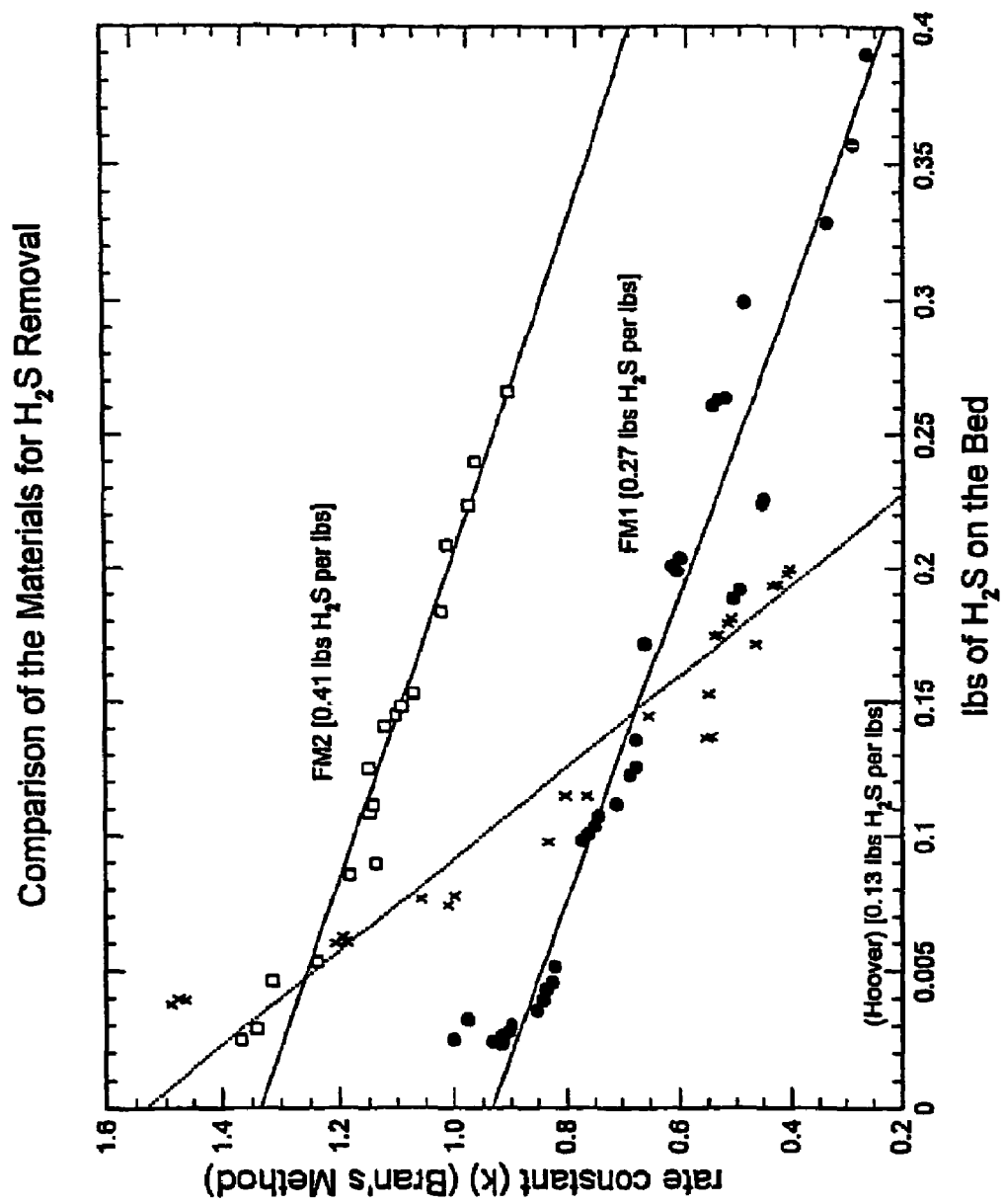
FIG. 5 describes the same thing as in FIG. 4, except it compares three different types of iron oxide.
Figure 6:
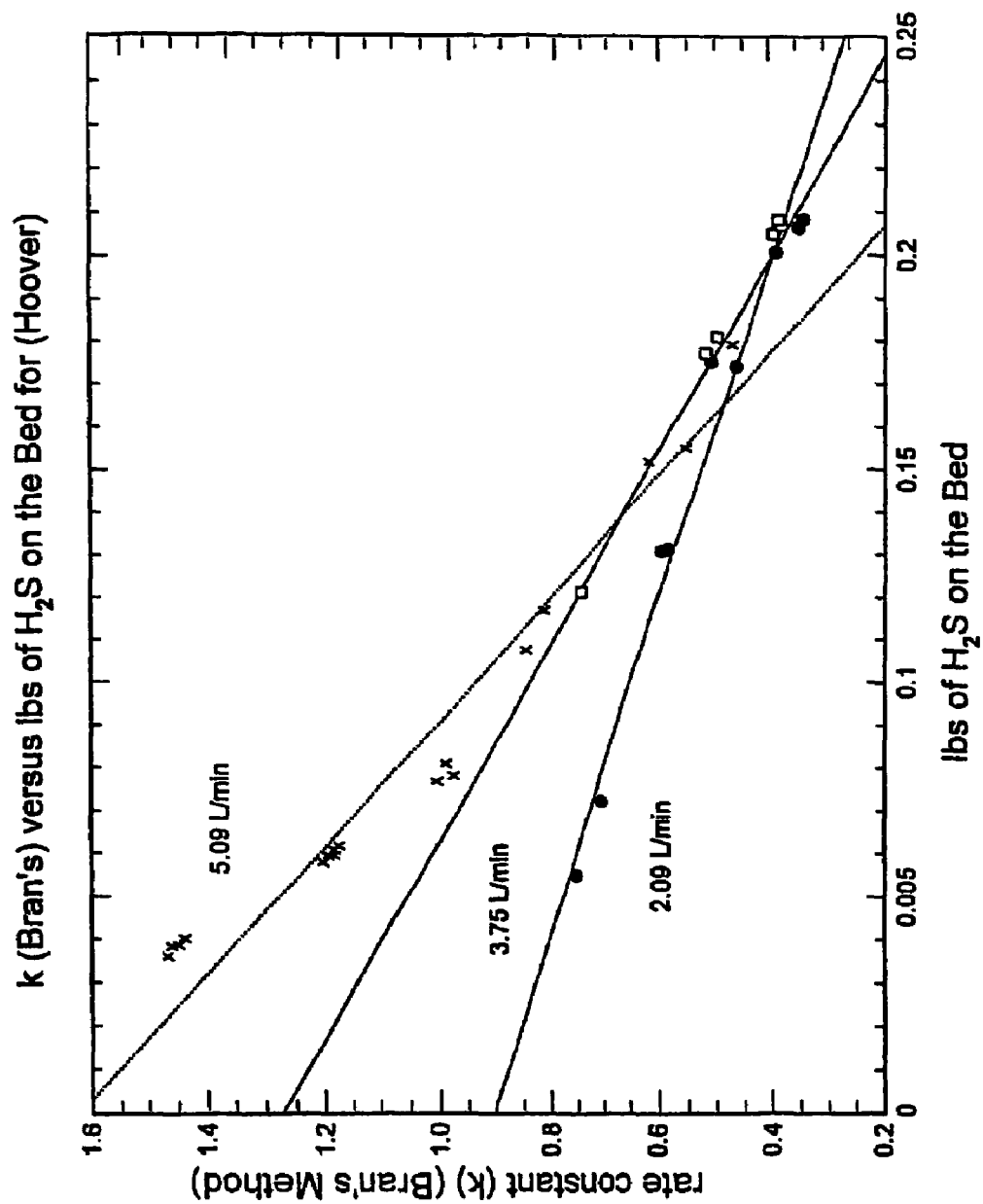
FIG. 6 describes the same thing as FIG. 4, except it relates to a different type of iron oxide.

The rate constants (k) were calculated from a determination of the outlet $H_2S$, with the outlet $H_2S$ (lbs.) equation as follows: $\Sigma[H_2S$ reacted over $\Delta t$ (lbs.)]. FIG. 4 plots the rate constant versus the pounds of $H_2S$ on the bed for FM1 oxide material. Three different flow rates were used. The (Bran's) constant k was highest at the fastest flow rate of 5.09 L/min. The slope of the curve equates to the rate of reactivity over time. The steeper the curve, the faster the reactivity will be reduced. Thus, the slope of the lines in FIGS. 4, 5, and 6 indicate reactivity. FIG. 6 shows the same thing as FIG. 4, except the iron oxide was the Hoover species. FIG. 5 relates to the same data as in FIG. 4, except three different types of iron oxides were tested.

The FM2 had the highest rate of reactivity, followed by the FM1. Both compositions showed excellent reactivity. The Hoover material was observed to be not as good a candidate for use as the other two materials. From the k determination, the estimated per pound capacity for holding $H_2S$ by the oxide was determined using linear regression analysis of a plot of k versus lbs. of total $H_2S$ on the bed. The estimated capacity is listed below. Further, the slope of the linear regression analysis relates to the speed of reaction between the oxide material and the $H_2S$, which is R. The x intercept of the plots gave the overall capacity of the materials. The results are summarized as follows:

TABLE 4

LINEAR REGRESSION ANALYSIS OF K VS. ACCUMULATED LBS OF REACTED 112S WITH THE BED

| Material | Q (L/min) | Slope | Est. Capacity per Pound | k range | R |
|---|---|---|---|---|---|
| LCI (FM2) | 5.09 | −1.6 | 0.41 | 1.35-1.15 | 0.976 |
| LCI (FM1) | 2.09 | −1.2 | 0.30 | 0.70-0.56 | 0.992 |
| LCI (FM1) | 3.75 | −1.5 | 0.30 | 0.94-0.72 | 0.998 |
| LCI (FM1) | 5.09 | −1.4 | 0.31 | 0.92-0.70 | 0.975 |
| LCI (FM1) All data | — | −1.7 | 0.27 | 0.94-0.70 | 0.959 |
| LCI (Hoover) | 2.09 | −2.6 | 0.17 | 1.72-0.69 | 0.982 |
| LCI (Hoover) | 3.75 | −4.3 | 0.15 | 1.28-0.72 | 0.998 |
| LCI (Hoover) | 5.09 | −6.9 | 0.12 | 0.90-0.58 | 0.992 |
| LCI (Hoover) all data | — | −5.8 | 0.13 | 1.58-0.67 | 0.984 |

As can be seen, the FM2 and FM1 had superior results for holding an amount of $H_2S$ per pound of iron oxide (see Est. Capacity per Pound).

Example 6

The reaction rate k, from Example 5, was analyzed to determine whether the pelletized iron oxide had a better reaction efficiency than non-pelletized iron oxide. FIG. 7 is a combined plot of outlet $H_2S$ readings (ppm) v. pounds of $H_2S$ that has reacted with a bed of pelletized material, either the (FM1), (Hoover), or non-pelletized iron oxide materials, at a flow rate of 2.09 L/min. These curves relate to the outlet readings of $H_2S$ (ppm) to the amount of reacted $H_2S$ with the bed, and directly illustrate the reactive speed of the materials.

As can be seen in FIG. 7, two pounds of FM1 product reacted with 0.38 pounds of $H_2S$ before the outlet $H_2S$ reached 900 ppm. This is compared with non-pelletized iron oxide, which had only 0.15 pounds of iron oxide reacted before the $H_2S$ reached a level of 900 ppm at the outlet. This shows that the pelletized iron oxide gives a superior result and reacts with a greater amount of $H_2S$ than non-pelletized iron oxide.

Example 7

The present Example compared pelletized zinc oxide with SULFATREAT® (iron oxide on a montmorillonite carrier). The conditions and results are as follows:

|  | ZnO | SulfaTreat |
|---|---|---|
| Bed Height | 2.0 ft | 2.0 ft |
| Pressure | 5 psig | 5 psig |
| Flow Rate | 270 cc/min. | 270 cc/min. |
| Temp | 70° F. | 70° F. |
| Inlet Conc. | 3000 + ppm $H_2S$ in $N_2$ | 3000 ppm $H_2S$ |
| Diameter | 1.5 in. | 1.5 in. |
| Weight | 1065 gms | 827 gms |
| Volume | 815 mL | 815 mL |
| Total Gas Used | 12830 L | 14774 L |
| Total $H_2S$ Removed | 38.5 L | 44.3 L |
| Days to Breakthrough | 33 | 38 |

The ZnO ran for 33 days before hydrogen sulfide broke through. This is 5 days shorter than SULFATREAT® ran at the same conditions. Although the ZnO did not remove as much sulfur as SULFATREAT®, the results are positive. ZnO is mainly used at elevated temperatures, and this test was run at room temperature and still removed $H_2S$.

Example 8

The present Example relates to the preparation of exemplary metal oxide pellets used in the removal of sulfur from fluids. The method was initiated by obtaining a sample of black iron oxide from the Ironite Products Company, Inc. of St. Louis, Mo. The black iron oxide was analyzed and determined to contain an amount of moisture equal to 3% by weight. Additionally, it was determined that the black iron oxide had a bulk density of 1.558 kg/L.

To form the metal oxide pellets, 9,000 gms of the black iron oxide was placed in a bladekneader, manufactured by Sigma Corporation, St. Louis, Mo. To the black iron oxide, an amount of binder solution was added. The binder solution was formed by mixing 118 gms of starch manufactured by Argo to boiling water. Starch was measured so that it was equal to 1.34% by weight starch on a dry weight basis, so that the total binder solution added to the black iron oxide was equal to 17.2% by weight. This formed a binder and iron oxide composition, which was then kneaded in the bladekneader for 5 minutes. A dough was produced that was slightly wet and sticky.

The iron oxide dough was then fed into a pellet press, Model 14-175 (manufactured by Kohl). The pellet press operated at 100 rpm and was equipped with a 6 mm die, having a 60 mm pressway length. The energy input for the pellet press was equal to about 1.51 kw, and the extrusion rate was equal to 224 kg per hour.

After extrusion, the pellets were processed in a marumerizer (made by LCI Corporation, Charlotte, N.C.), with an 8 mm friction plate turning at 300 rpm for 10 seconds. The pellets were then oven dried at a temperature of about 200° F., and it was determined that the pellets had a bulk density of approximately 1.25 kg/L. Additionally, it was determined that the pellets had a hardness equal to about 6.0 kg.

Example 9

An iron oxide pellet was formed that included a cellulose binder. The process of formation was as follows:

1. In a tank, 64 lbs. of water was added to 50 lbs of cellulose and mixed.
2. Next, 1000 lbs. of iron oxide with a moisture content of 1% or less was added to the cellulose and water mixture.

3. The constituents were mixed until a homogenous blend was formed.
4. The blend was then pressed at 45,000 psi to form the pellets. The resultant pellets were of the following composition:

| Component | % By Weight |
|---|---|
| Iron | 89 |
| Cellulose | 5 |
| Water | 6 |

Thus, there has been shown and described a method relating to the use of compressed metal oxide composition particles for removing contaminants from fluids and a method for making such compressed metal oxide composition particles, which fulfill all the objects and advantages sought therefore. It is apparent to those skilled in the art, however, that many changes, variations, modifications, and other uses and applications for the subject compressed metal oxide composition and methods are possible, and also such changes, variations, modifications, and other uses and applications which do not depart from the spirit and scope of the invention are deemed to be covered by the invention, which is limited only by the claims which follow.

What is claimed is:

1. A method for removing sulfur compounds from fluids, the method comprising:
    (a) forming compressed metal oxide composition particles that comprise at least one metal oxide and a binder with a method that comprises mixing the at least one metal oxide and the binder to form a metal oxide mixture, compacting said metal oxide mixture to form a compressed metal oxide composition, breaking said compressed metal oxide composition to form said compressed metal oxide composition particles, and screening said particles so that at least 90% of said particles have a final particle size equal to between about 0.1 mm and about 200 mm, wherein the metal of the at least one metal oxide is a iron, zinc, or manganese; and,
    (b) passing the fluids over said compressed metal oxide composition particles, thereby causing removal of the sulfur compounds from the fluids, wherein the fluids passed over said compressed metal oxide composition particles are at a temperature that is less than 200° C.

2. A method for removing sulfur compounds from fluids, the method comprising:
    (a) forming compressed metal oxide composition particles that comprise at least one metal oxide and a binder with a method that comprises mixing the at least one metal oxide and the binder to form a metal oxide mixture, extruding said metal oxide mixture to form a compressed metal oxide composition, breaking said compressed metal oxide composition to form said compressed metal oxide composition particles, drying said particles at a temperature ranging between ambient and less than 150° C., marumerizing said particles, and screening said particles so that at least 90% of said particles have a final particle size equal to between about 0.1 mm and about 200 mm from other particles, wherein the metal of the at least one metal oxide is iron, zinc, or manganese; and,
    (b) passing the fluids over said compressed metal oxide composition particles, thereby causing removal of the sulfur compounds from the fluids, wherein the fluids passed over said compressed metal oxide composition particles are at a temperature that is less than 200° C.

3. A method for substantially reducing the concentration of sulfur compounds in a fluid, the method comprising passing the fluid over a plurality of particles of a compressed metal oxide composition, wherein the compressed metal oxide composition comprises:
    (a) at least one metal oxide of the formula $Me_xO_y$, or hydrated forms thereof, wherein Me is an element selected from the group consisting of periodic table row 4, 5, 6 and 7 metals, x is a number that is at least about 1 and no greater than about 3, and y is a number that is at least about 1 and no greater than about 4, and wherein the at least one metal oxide is present in an amount of at least 80% by weight of the compressed metal oxide composition; and
    (b) an organic binder, wherein the organic binder is selected from the group consisting of a water insoluble cellulose composition, a starch composition, carboxymethylcellulose, and a mixture of a starch composition and carboxymethylcellulose; and
    wherein at least about 90% of the particles of the compressed metal oxide composition have a particle size equal to about 0.1 mm to about 200 mm, and wherein the particles of the compressed metal oxide composition can retain an average amount of sulfur compounds equal to at least about 10% by weight of the compressed metal oxide composition.

4. The method of claim 3, wherein the particles of compressed metal oxide composition have a particle size from about 0.1 mm to about 20 mm.

5. The method of claim 3, wherein the particles of compressed metal oxide composition have a particle size from about 0.5 mm to about 5 mm.

6. A method for removing contaminants from a fluid the method comprising, passing the fluid over a plurality of particles of a compressed metal oxide composition, wherein the compressed metal oxide composition comprises:
    (a) at least one metal oxide of the formula $Me_xO_y$, or hydrated forms thereof, wherein Me is an element selected from the group consisting of periodic table row 4, 5, 6 and 7 metals, x is a number that is at least about 1 and no greater than about 3, and y is a number that is at least about 1 and no greater than about 4, and wherein the at least one metal oxide is present in an amount of at least 80% by weight of the compressed metal oxide composition; and
    (b) an organic binder, wherein the organic binder is selected from the group consisting of a water insoluble cellulose composition, a starch composition, carboxymethylcellulose, and a mixture of a starch composition and carboxymethylcellulose; and
    (c) an activator, wherein the activator is selected from the group consisting of copper oxide, silver oxide, gold oxide, platinum oxide, cadmium oxide, nickel oxide, palladium oxide, lead oxide, mercury oxide, tin oxide, cobalt oxide, manganese oxide, aluminum oxide, and combinations thereof; and
    wherein at least about 90% of the particles of the compressed metal oxide composition have a particle size equal to about 0.1 mm to about 200 mm.

7. The method of claim 6, wherein the particles of compressed metal oxide composition have a particle size from about 0.1 mm to about 20 mm.

8. The method of claim 6, wherein the particles of compressed metal oxide composition have a particle size from about 0.5 mm to about 5 mm.

9. The method of claim 3, wherein Me is selected from the group consisting of iron, zinc, and manganese.

10. The method of claim 3, wherein Me is iron, x is about 3, and y is about 4.

11. The method of claim 3, wherein the fluid passed over said compressed metal oxide composition particles is at a temperature that is less than 200° C.

12. The method of claim 6, wherein Me is selected from the group consisting of iron, zinc, and manganese.

13. The method of claim 6, wherein Me is iron, x is about 3, and y is about 4.

14. The method of claim 6, wherein the fluid passed over said compressed metal oxide composition particles is at a temperature that is less than 200° C.

* * * * *